United States Patent [19]

Shirasaki et al.

[11] Patent Number: 5,677,767
[45] Date of Patent: Oct. 14, 1997

[54] FIBER RING INTERFEROMETER USING A KERR MEDIUM OPTICAL FIBER LOOP

[76] Inventors: Masataka Shirasaki, 29 Foster Rd., Belmont, Mass. 02178; Hermann A. Haus, 3 Jeffrey Ter., Lexington, Mass. 02173

[21] Appl. No.: 501,885

[22] Filed: Jul. 13, 1995

Related U.S. Application Data

[63] Continuation of Ser. No. 318,199, Oct. 5, 1994, abandoned, which is a continuation of Ser. No. 928,876, Aug. 11, 1992, abandoned.

[51] Int. Cl.$^6$ ..................................................... G01C 19/72
[52] U.S. Cl. ................................................................ 356/350
[58] Field of Search ................................................ 356/350

[56] References Cited

U.S. PATENT DOCUMENTS

| | | | |
|---|---|---|---|
| 4,342,517 | 8/1982 | Johnson et al. | 356/350 |
| 4,433,915 | 2/1984 | Hanse | 356/350 |
| 4,436,442 | 3/1984 | Schiffner | 356/349 |
| 4,483,617 | 11/1984 | Matsumura et al. | 356/350 |
| 4,529,313 | 7/1985 | Petermann et al. | 356/350 |
| 4,588,296 | 5/1986 | Cahill et al. | 356/359 |
| 4,621,925 | 11/1986 | Masuda et al. | 356/350 |
| 4,887,900 | 12/1989 | Hall | 356/350 |
| 4,915,503 | 4/1990 | Pavlath | 356/350 |
| 4,997,282 | 3/1991 | Pavlath | 356/350 |
| 5,018,857 | 5/1991 | Sanders et al. | 356/350 |
| 5,037,205 | 8/1991 | Pavlath | 356/350 |

FOREIGN PATENT DOCUMENTS 0196414  11/1983  Japan ...................................... 356/350

OTHER PUBLICATIONS

C.R. Doerr et al., "Orthongonal polarization fiber gyroscope with with increased stability and resolution", Applied Optics, vol. 33, No. 34, Dec. 1, 1994.

Jinno, M., Matsumoto, T., *Ultrafast, Low Power, and Highly Stable All–Optical Switching In An All Polarization Maintaining Fiber Sagnac Interferometer,* IEEE Photonics Technology Letters vol. 2, No. 5 pp. 349–351, May 1990.

Ivanov, V.V., Ivanov, G.A., Novikiv, A.G., Sverchkov, Yu.E.; Telegin, G.I., *Fiber–Optics Ring Interferometer With An Automated Data–Acquisition And Processing System,* Priboty i Tekhnika Eksperimenta, vol. 27, No. 4, pp. 163–165, Jul.–Aug. 1984.

(List continued on next page.)

*Primary Examiner*—Samuel A. Turner
*Attorney, Agent, or Firm*—Wolf, Greenfield & Sacks, P.C.

[57] ABSTRACT

The invention comprises an interferometer for detecting rotation in which a single light beam is split by a first polarizing beam splitter into two linearly, orthogonally polarized beams and introduced to opposite ends of a linear polarization maintaining fiber optic loop formed of a Kerr medium optical fiber material having a 90° twist therein. Upon exiting the opposite ends of the loop, the two beams are recombined by the first polarizing beam splitter into a single beam. The recombined light beam is seperated from the input light beam and is passed through a quarter-wave plate which converts the linear polarization to circular polarization. The circularly polarized beam is then passed through a second polarizing beam splitter to form two separate beams of distinct intensity dependent upon the two distinct circular polarizations contained in the incident beam. The two light beams are introduced to a balanced detector whereupon the difference in intensity of the two light beams is detected. This difference in intensity indicates the rotational direction and velocity of the fiber optic loop, thus allowing the device to be used to detect rotation.

45 Claims, 3 Drawing Sheets

OTHER PUBLICATIONS

Alekseev, E.I., Bazarov, E.N., Izraelyan, V.G., *Polarization Stabilization In A Fiber–Optic Ring Interferometer*, Kvantovaya Electronika, Moskva, vol. 14, No. 1, pp. 171–173, Jan. 1984.

Mackintosh, J.M., Culshaw, B., *Analysis And Observation of Coupling Ratio Dependence of Rayleigh Backscattering Noise in a Fiber Optic Gyoscope*, Journal of Lightwave Technology, vol. 7, No. 9, pp. 1323–1328, Sep. 1989.

Mackintosh, J.M., McMillan, J.L., Culshaw, B. *Coherent Backscatter in the Phase–Modulated Fibre Optic Gyroscope*, Proceedings of the SPIE, The International Society for Optical Engineering, vol. 630, pp. 171–173, Jan. 1984.

Abstract of Patent No. EP 425079, Mackintosh et al., May 2, 1991.

Abstract of Patent No. GB 2,190,188, Giles et al., Nov. 11, 1987.

Abstract of Patent No. GB 2,119,083, Culshaw et al., Nov. 9, 1983.

Abstract of Patent No. GB 2,227,313, Kajioka, Dec. 27, 1988.

Abstract of Patent No. CH 671638, Dandliker, Sep. 15, 1989.

Abstract of Patent No. WO 8,602,721, Martin et al., May 9, 1986.

Abstract of Patent No. JP 60257313, Dec. 1985.

Abstract of Patent No. GB 2,089,976, Peterman et al., Jun. 30, 1982.

Abstract of Patent No. EP 50059, Papuchon et al., Apr. 21, 1982.

Abstract of Patent No. DE 3,035,153, Ulrich, Apr. 22, 1982.

Abstract of Patent No. DE 3,006,580, Peterman, Aug. 27, 1981.

Bergman, K., Haus H.A., *Squeezing in Fibres With Optical Pulses* Optic Letters, vol. No. 9, May 1, 1991.

Shirasaki, M., Haus, H.A., *Squeezing of Pulses in a Nonlinear Interferometer* Optical Society of America, vol. 7, No. 1, Jan. 1990 scope With Short Coherence Length Source Injects Light Into Loop In Opposite Directions, Detects Interference of Beams After Several Revolutions And Has Reflector Or 2nd Loop.

FIBER RING INTERFEROMETER USING A KERR MEDIUM OPTICAL FIBER LOOP

This application is a continuation of application Ser. No. 08/318,199, filed Oct. 5, 1994, now abandoned, which is a continuation of application Ser. No. 07/928,876, filed Aug. 11, 1992, now abandoned.

FIELD OF THE INVENTION

The invention pertains to Sagnac type optical fiber interferometers. More particularly, the invention pertains to an improved Sagnac type interferometer in which the effect of noise and other interference on the accuracy of the interferometer is minimized.

BACKGROUND OF THE INVENTION

A Sagnac interferometer is a device which can be used, among other things, to detect rotational motion and velocity. In a Sagnac interferometer, coherent light (that is, light of a single wavelength and a single phase) is split into two beams and introduced into opposite ends of a loop of optical fiber cable. The loop need not be circular, but it is preferably bent such that the two ends of the loop are at the same location. The light introduced at each end of the loop propagates through the loop and appears at the opposite end. Since the two light beams were in phase when introduced to the loop and since they travel over the same path, i.e., distance, when they reach the respective opposite ends of the cable, they should still be in phase with each other if the loop is stationary. However, if the loop rotates while the light travels through it, the light traveling in the direction in which the loop is rotated (e.g., clockwise) travels a greater distance before reaching the opposite end of the loop than the light traveling in the opposite direction through the loop. If the loop is formed in a circle of radius r, the distance each beam travels through the stationary loop is $2\pi r$ and the amount of time, t, that the light takes to travel through the stationary loop is $2\pi r/c$, where c is the speed of light through the optical fiber material. If the loop rotates while each of the light beams are traveling through it, the light beam traveling in the direction of rotation of the loop does not travel over a distance $2\pi r$, but rather travels over a distance $2\pi r+\Delta_{d1}$, where $\Delta_{d1}=\theta_1 r$ and $\theta_1 r$ is the angle traversed by the loop during the period that the light beam traveling in the direction of rotation travels through the loop. The light traveling through the loop in the direction opposite to the direction of rotation travels a distance $2\pi-\Delta_{d2}$, where $\Delta_{d2}=\theta_2 r$ and $\theta_2$ is the angle traversed by the loop during the period that the light beam traveling in the opposite direction of rotation travels through the loop. $\theta_1$ and $\theta_2$ are equal if the loop stops rotating before either of the oppositely directed beams of light reach the respective opposite ends of the cable. However, if the loop rotates continuously during the period that the two light beams are traveling through the loop, then $\theta_1$ is slightly larger than $\theta_2$ because the loop continues to rotate during the period after the beam traveling in the direction opposite to the direction of rotation of the loop exits the opposite end of the loop, but before the beam traveling in the direction of rotation exits the end of the loop. In any event, the difference in distance traveled by the two light beams to reach the respective opposite ends of the loop is $\Delta_{d1}+\Delta_{d2}$ or approximately $2\Delta d$ where $\Delta d$ is the average of $\Delta_{d1}$ and $\Delta_d 2$.

The difference in distance traveled of $2\Delta_d$ causes the light exiting from the opposite ends of the loop to no longer be in phase. The phase difference, $\Delta_p$, is a direct function of the distance $\Delta_d$ and is given by the equation, $\Delta_p=2\pi\Delta_d/\lambda$, where $\lambda$ is the wavelength of the light. An interferometric detector determines the phase difference of the two beams based on the interference pattern of the two beams which directly indicates the direction and velocity of rotation of the loop.

In an actual Sagnac interferometer, the optical fiber cable is looped many times around a cylinder in order to increase the distance traveled; however, the concept is exactly the same as that described above with respect to a single loop.

Discrete light pulses are typically used in a Sagnac interferometer, however, continuous wave light beams may also be used.

Since Sagnac interferometers detect extremely small phase differences, accuracy can be greatly compromised by even small signal degradation in the system. As light beams travel over distance, the beams are subject to interference and are generally degraded. Such degradation is not of concern in the optical fiber loop where the two light beams travel over the same path. Such beams are subject to the same interference and degradation and thus the effect of such degradation is cancelled out when the two beams are compared. However, in a typical Sagnac interferometer, when the two light beams exit from the opposite ends of the fiber optic loop, they travel over different paths before reaching the detector and are thus subject to different interference and degradation. This may cause an unwanted relative phase shift between the two beams and lead to inaccuracies in the operation and a general decrease in sensitivity of the interferometer.

Accordingly, it is an object of the present invention to provide an improved Sagnac interferometer.

It is a further object of the present invention to provide a Sagnac interferometer which is immune to interference and degradation of the two light signals.

It is another object of the present invention to provide a more accurate and sensitive Sagnac interferometer.

SUMMARY OF THE INVENTION

The various objects and goals are met in the present invention by providing a means by which the two light beams exiting from opposite ends of the optical fiber cable of a Sagnac interferometer are allowed to travel over the same path to the interferometric detector. In the invention, a single polarized light beam is split by a polarizing beam splitter into two orthogonally polarized coherent beams. These light beams are introduced into opposite ends of, and travel in opposite directions around, a polarization maintaining optical fiber loop. A 90° twist is imparted to the cable. Upon exiting the opposite ends of the loop, each of the beams again strike the polarizing beam splitter and, since their polarizations have been shifted 90° by the twist in the cable, are recombined into a single beam.

The combined light beam is passed through a birefringent quarter-wave plate which converts linear polarized light to circular polarized light. The two distinct polarizations which comprise the combined beam are converted to circular polarizations which are also distinct from each other. The beam is then forwarded to a second polarizing beam splitter, which splits the beam into two beams of distinct intensities depending upon the particular circular polarization of the combined beam, which, in turn, depends upon the relative phase difference of the two beams which were combined to form the beam. The two separated light beams are immediately introduced to a balanced detector. The balanced detector detects the difference in intensity between the two light beams. The difference in power indicates the loop's rotational direction and velocity. The interferometer can be mounted, for instance, in a boat or plane and be used as an optical fiber gyro for detecting rotation of the boat or plane.

IN THE DRAWING

DETAILED DESCRIPTION OF THE INVENTION

Figure 1:
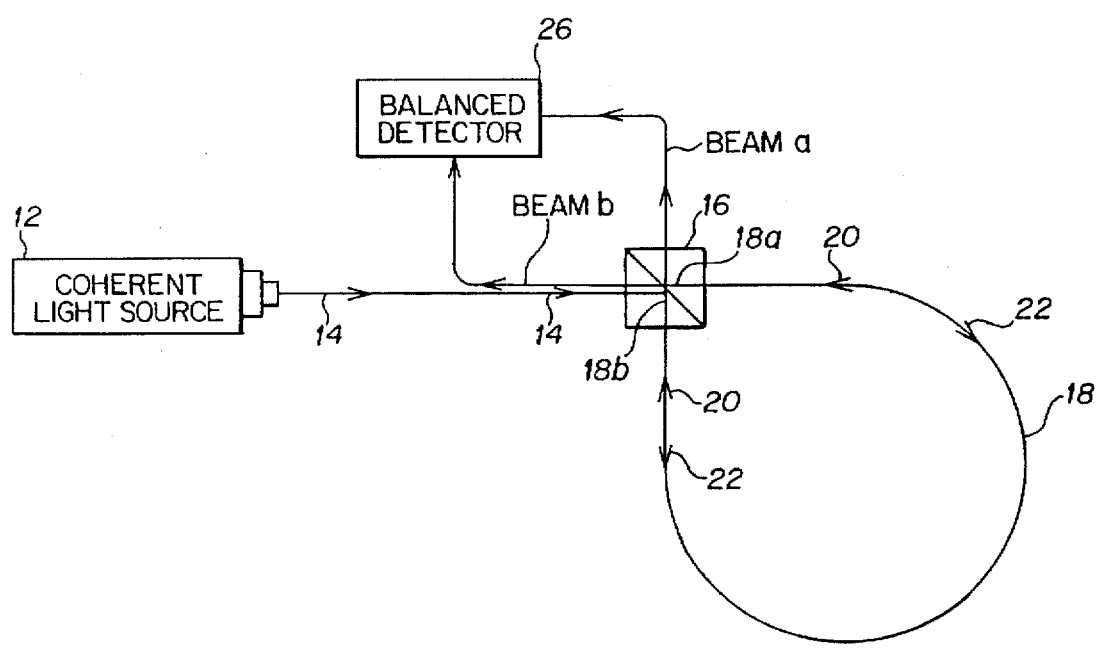
FIG. 1 is a simplified diagram of a typical prior art Sagnac interferometer.

FIG. 1 is a simplified diagram of a prior art Sagnac interferometer. A light source 12 produces a beam of light 14 which is directed towards a 50/50 beam splitter 16. The beam splitter 16 passes half of the light into end 18a of an optical fiber loop 18 and reflects the other half of the light into end 18b of the loop 18.

Beam splitter 16 splits the beam, much like a two way mirror, by reflecting half of the incident light and allowing half of the incident light to pass through. The beam is typically split regardless of the particular properties of the incident beam. That is, there is no particular property or properties of the light which dictate which light rays pass through the beam splitter and which are reflected off the beam splitter.

The beam directed into end 18a (hereinafter beam a) travels in the direction of arrow 20 through the fiber optic loop 18. The beam which is directed towards end 18b (hereinafter beam b) travels around the loop in the opposite direction, as illustrated by arrow 22. Beam a exits the loop from end 18b and is directed to interferometric detector 26. Beam b exits the loop from end 18a and is directed to interferometric detector 26. Various means are well known to those skilled in the art for directing light beams. Such means might include mirrors, waveguides or additional optical fiber cables. However, FIG. 1 does not show such well known light directing means in order not to obfuscate the invention.

As discussed above, if the loop 18 was not in motion as beams a and b passed through it, then beams a and b, which were in phase upon entering the loop 18, will still be in phase when they reach balanced detector 26, if there was no undesired signal degradation. In such a case, the phases of beams a and b will overlap causing constructive interference over the entire wavelength spectrum in detector 26, thus indicating no phase shift and, consequently, that the loop was stationary. However, if the loop was rotating, beams a and b will not be in phase upon exiting loop 18 and detector 26 will detect a different interference pattern. As described above, the interference pattern can be used to determine the phase shift between beams a and b and thus the direction and velocity of rotation of the loop.

As seen in FIG. 1, beams a and b travel over different space once they exit from the optical fiber loop 18. In fact, beams a and b must travel over different paths because, if recombined, there will be no way to distinguish the phase properties of beam a from the phase properties of beam b in detector 26. Since they travel through different paths, beams a and b may be subject to different noise and other types of degradation which might cause a relative phase shift between the two beams. Any relative phase shift caused outside of the fiber optic loop 18 is undesirable because the phase difference between beam a and beam b would no longer be due solely to the rotation of the optical fiber loop, thus causing inaccurate results in detector 26. As one particular example, a temperature difference between the paths over which beams a and b travel would cause a relative phase shift between the two beams. Since the typical phase shift which occurs in a fiber optic gyro is extremely small, very minor errors, even on the order of a factor of $10^{-10}$, create noticeable inaccuracy.

Figure 2:
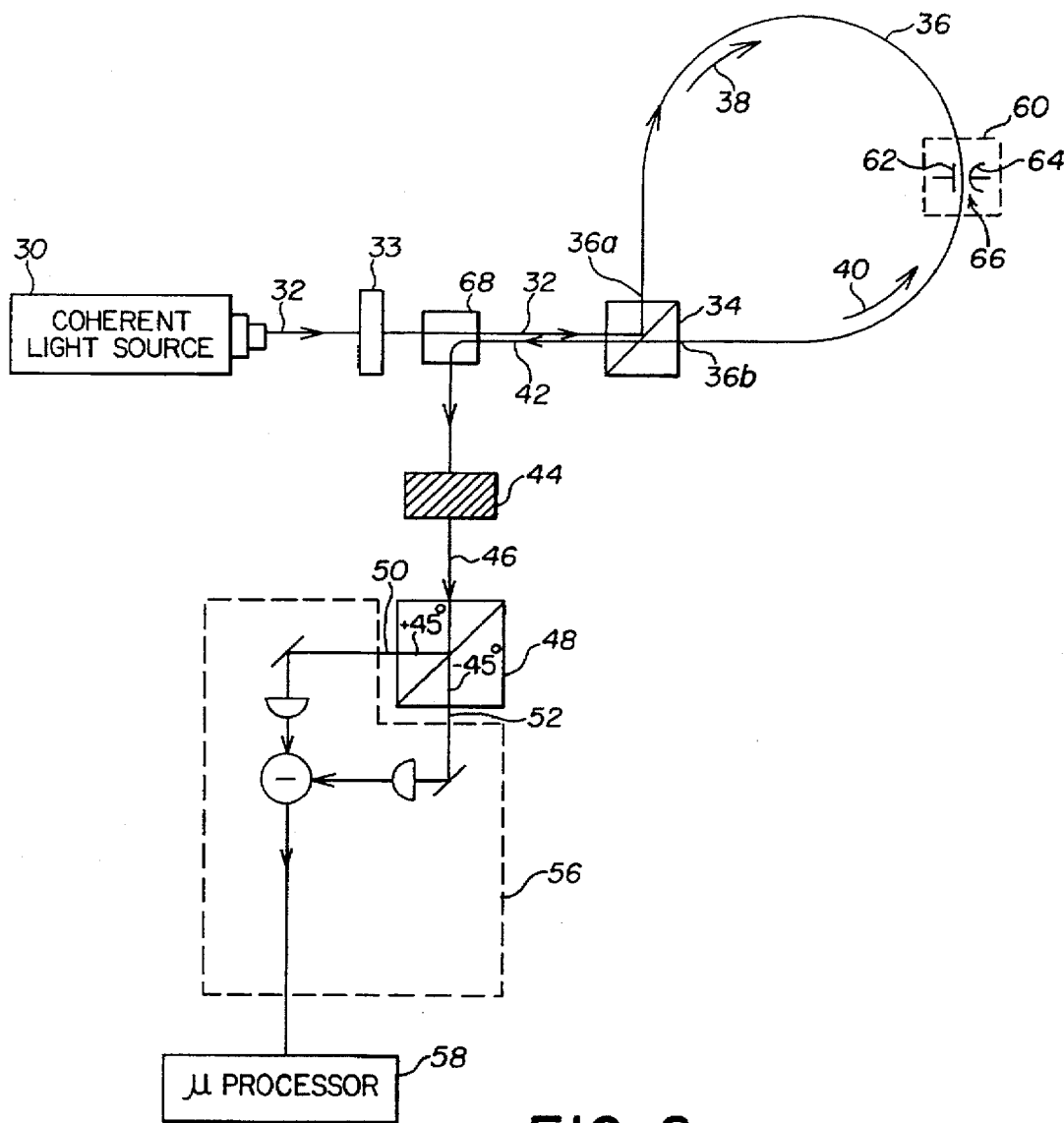
FIG. 2 is a simplified diagram of a preferred embodiment of the interferometer of the present invention.

FIG. 2 is a simplified illustration of a fiber optic interferometer of the present invention. A light source 30, which may, for example, be a laser, produces a light beam 32. Light beam 32 is preferably polarized by a polarizer 33 and more preferably linearly polarized to have a polarization vector of 45° as shown in the polarization vector graph of FIG. 3A.

Polarized light is light in which the fields of all the light rays are aligned. In particular, a light wave comprises an electric and a magnetic field oscillating perpendicular to each other and to the direction the wave is traveling. Polarization, in general, exists where there is an alignment relationship between all the light waves comprising a beam of light. Linear polarization is the specific situation where the beam comprises waves all of which have their electric fields in the same plane. (Since the electric and magnetic fields of a given wave are always perpendicular, if their electric fields are aligned in a first plane, their magnetic fields are necessarily aligned in a second plane which is perpendicular to the first plane). Circular or elliptic polarization exists where the fields of the various light waves comprising a beam change regularly along the light wave.

Beam 32 is directed through a polarizing beam splitter 34. Preferably, beam splitter 34 splits the beam polarized along the 45° axis creating two light beams of equal intensity which are linearly, orthogonally polarized (hereinafter beams c and d), as illustrated by FIG. 3B. The beam splitter 34 reflects the component of the incident beam 32 which is linearly polarized in a first orthogonal direction (e.g., the parallel direction) and transmits the portion of the incident beam 32 which is linearly polarized in the other orthogonal direction (e.g., the perpendicular direction).

Reflected beam c enters fiber optic loop 36 at end 36a while transmitted beam d enters fiber optic loop at the opposite end 36b. Beam c travels around the fiber optic loop 36 in the direction of arrow 38 while beam d travels around the fiber optic loop 36 in the direction of arrow 40. Fiber optic loop 36 is constructed of a linear polarization maintaining fiber such that the polarizations of beams c and d are preserved in the loop 36. In the fiber loop, beams c and d are time reversed from each other.

Normal optical fibers are insensitive to polarization and the polarization properties of the waves in the fiber can change. Unless the optical fiber is very short, any polarization properties which a light beam entering the fiber might have had will be lost by the time it reaches the other end of the fiber. Polarization maintaining fibers, however, maintain the polarization of the light that originally entered the fiber with the eigen polarization of the particular fiber. Such fibers have different properties for light of different polarizations. For instance, currently available linear polarization maintaining fibers can maintain the polarization properties of linearly polarized light introduced into the fiber at one of two orthogonal eigen polarizations of the fiber. The fiber can maintain light entering the fiber at only one of its eigen polarizations at a time. In such a fiber, the two orthogonal linear polarizations are isolated from each other as the light travels along the fiber. Accordingly, when light emerges from the opposite end of a linear polarization maintaining fiber, it has the same polarization relative to the end of the fiber at which it entered.

In the present invention, ends 36a and 36b of the fiber optic cable are twisted 90° with respect to one another such that light which enters one end in a particular polarization, e.g., parallel polarization, exits from the opposite end shifted 90°, e.g., perpendicular polarization. Accordingly, when beam c, which entered fiber optic loop 36 at end 36a in the parallel polarization exits from end 36b, and again strikes polarizing beam splitter 34, instead of being reflected, this time it will be transmitted. Likewise, beam d, which comprises the light of perpendicular polarization of original beam 32 which was transmitted through polarizing beam splitter 34, exits from end 36a in parallel polarization. Since it is in parallel polarization, it is reflected by polarizing beam splitter 34, instead of transmitted through it. In this manner, beams c and d are recombined by the beam splitter 34 as they exit from opposite ends of the fiber optic loop to form a single recombined beam 42. Alternately, instead of twisting the cable 90° from end to end, a half-wave plate having a 45° axis can be placed at one end of the fiber.

As explained above, if the fiber optic loop was rotating while light beams c and d were passing through it in opposite directions, there will be a relative phase difference between the light comprising the two beams. Accordingly, recombined beam 42 would comprise light of two different phases.

Recombined beam 42 is separated from the incoming beam 32 by a nonreciprocal 68 element (for example an optical switch or Faraday circulator) and is directed to a birefringent quarter-wave plate 44. The plate has different speeds of propagation through it for light of different polarizations. Accordingly, the relative phase difference between the two beam components which comprise recombined beam 42 is altered. In particular, a quarter-wave plate shifts phase by $\pi/2$, i.e., a quarter-wavelength. Accordingly, a quarter-wave plate would convert light that is linearly polarized to light which is circularly polarized.

Figure 3A:
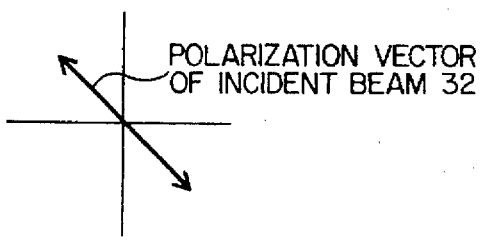
FIGS. 3A–3G are graphs of the polarization vectors of various exemplary light beams in various stages in the interferometer of the present invention.
Figure 3B:
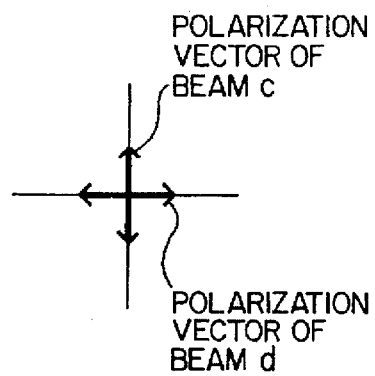
Figure 3C:
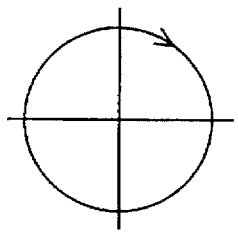
Figure 3D:
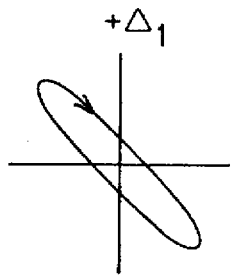
Figure 3E:
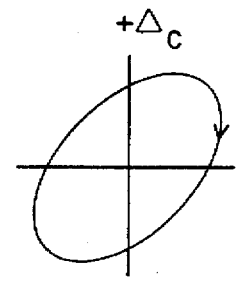

If there has been no relative phase shift between beams c and d, then recombined beam 42 will be like incident beam 32, i.e., linearly polarized at 45° as shown in FIG. 3A. A birefringent quarter-wave plate such as quarter-wave plate 44 would convert a 45° linearly polarized light beam such as shown in FIG. 3A to a circularly polarized beam such as shown in FIG. 3C. However, if there has been a relative phase shift of $\Delta_p$ due to rotation of the fiber optic loop, then recombined light beam 42 will no longer be perfectly linearly polarized but will be elliptically polarized prior to passing through quarter wave plate 44. FIG. 3D illustrates an exemplary polarization vector graph of recombined light beam 42 if there had been a small phase shift in the loop. Quarter wave plate 44 would convert the elliptical polarization of FIG. 3D to the elliptical polarization shown in FIG. 3E.

Figure 3F:
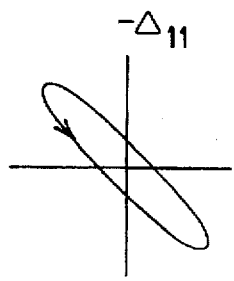
Figure 3G:
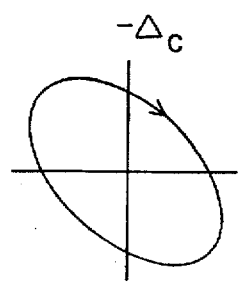

Had the phase shift been in the opposite direction, i.e., $-\Delta_p$, then the polarization of recombined beam 42 would have been as shown in FIG. 3F, which would be converted by quarter-wave plate 44 to the form shown in FIG. 3G. As illustrated by FIGS. 3F and 3G, the tilt of the graphical representation of the polarization vector indicates the direction in which the fiber optic loop was rotating whereas the degree to which the polarization vector is elliptically stretched from a pure circle before passing through plate 44, or from a straight line, after passing through plate 44, indicates the magnitude of the relative phase difference $\Delta_p$.

The beam 46 exiting from quarter-wave plate 44 is applied to a second 45° linear polarizing beam splitter 48 which splits beam 46 into two separate beams 50 and 52. If there has been a relative phase shift, the magnitude of the split beams 50 and 52 will not be equal. The relative intensities of the beams is a direct function of the phase difference of the two distinct beam components of the incident beam 46, which, in turn, is a function of the rotation direction and velocity of the optical fiber loop. Beams 50 and 52 are immediately introduced into a balanced detector 56. The balanced detector 56 determines the relative intensities of beams 50 and 52. The output of the balanced detector is directly indicative of the direction and magnitude of the phase shift and thus the rotation of the device. The output of detector 56 can, for instance, be forwarded to a microprocessor 58 for further analysis and/or recording. If the interferometer is used as a gyro, microprocessor 58 calculates the rotation direction and speed of the fiber optic loop based upon the relative intensities of beams 50 and 52 using well known techniques.

It should be understood by those skilled in the art that the two beams introduced to the optical fiber need not be linearly polarized but can be any two orthogonally polarized beams which are time reversed from one another and for which the fiber is able to maintain those polarizations. If circular polarization maintaining fiber was employed, the fiber would not need to be twisted 90° or need a half-wave plate at one end.

The optical fiber interferometer disclosed herein can be used as a fiber optic gyro for detecting rotation, for example, in planes or boats. The entire apparatus simply could be mounted to a boat. It requires no moving parts and is extremely sensitive.

The invention would also be useful in applications relating to "squeezing" of optical pulses as discussed in K. Bergman and H. A. Haus, *Squeezing in Fibers With Optical Pulses*, Optic Letters (1991) and M. Shirasaki and H. A. Haus, *Squeezing of Pulses in a Non-Linear Interferometer*, Journal of the Optical Society of America (1990), which references are incorporated herein by reference. In optical squeezing applications, the optical fiber could not be a linear polarization maintaining fiber, but could be an elliptical or circular polarization maintaining fiber.

A portion of the optical fiber cable 36 may be a Kerr medium as shown at 60 in FIG. 2. A Kerr medium is a medium in which birefringence is induced in a light beam by means of passing it through an electric field such as between the plates 62 and 64 of a charged capacitor 66. A Kerr medium is a medium having non-linear refractive properties. Particularly, in a Kerr medium, the index of refraction depends on the optical power. A Kerr medium can be used in optical "squeezing" as described in the above referenced articles.

Having thus described a few particular embodiments of the invention, various alterations, modifications and improvements will readily occur to those skilled in the art. For instance, it should be understood by persons of skill in the art that the two light beams which originally enter the optical fiber need not be of equal phase or intensity as long as the relative phases and intensities are known. Further, if and when circular polarization maintaining fiber is available, the loop may be constructed of such fiber and the two beams introduced to the loop may be circularly polarized instead of linearly polarized and quarter wave plate 46 could be eliminated. Also, neither of the polarizing beams splitters need be 45° polarizing splitters. Such alterations, modifica- tions and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A fiber ring interferometer having a detector, the interferometer comprising:

a loop formed of a Kerr medium optical fiber material, said loop comprising first and second ends, means for introducing first and second beams of coherent light into said first and second ends, respectively, of said loop such that said first and second light beams travel through said loop in opposite directions, said first and second beams being of respectively different polarizations, means for combining said first and second light beams into a recombined beam after they travel through said fiber optic loop, and means for separating said recombined beam from said first and second beams such that substantially all of said first and second beams of coherent light pass through said separating means and are passed to said introducing means and substantially all of said recombined beam is passed through said separating means to be separated from said first and second light beams and passed to the detector.

2. A fiber ring interferometer as set forth in claim 1 wherein said loop is comprised of polarization maintaining fiber.

3. A fiber ring interferometer as set forth in claim 2 wherein, said loop is comprised of linear polarization maintaining fiber, said first and second beams are linearly polarized, and said first and second ends of said loop are twisted relative to each other.

4. A fiber ring interferometer as set forth in claim 3 wherein said first and second beams are linearly polarized in, respectively, orthogonal directions, and said first and second ends of said loop are twisted 90° relative to each other.

5. A fiber ring interferometer as set forth in claim 4 wherein said fiber is circular.

6. A fiber ring interferometer as set forth in claim 5 wherein said means for combining said first and second beams to form said combined beam comprises a polarizing beam splitter.

7. A fiber ring interferometer as set forth in claim 6 wherein said first and second light beams are of equal intensity.

8. A fiber ring interferometer as set forth in claim 1 wherein said first and second beams of coherent light comprise optical pulses.

9. A fiber ring interferometer as set forth in claim 1 further comprising:

means for distinguishing light of said recombined beam contributed by said first light beam from light contributed by said second light beam based upon different polarizations of said first and second light beams; and means for determining a relative phase shift between said light contributed by said first light beam and said light contributed by said second light beam.

10. A fiber ring interferometer as set forth in claim 1 further comprising:

means, interposed between said distinguishing means and said separating means, for imparting a relative phase shift to said recombined light beam.

11. A fiber ring interferometer as set forth in claim 10, wherein said means for imparting a relative phase shift comprises a birefringent plate.

12. A fiber ring interferometer having a detector, the interferometer comprising:

a loop formed of linear polarization maintaining Kerr medium optical fiber, said loop comprising first and second ends twisted 90° relative to each other, a light source for producing a linearly polarized coherent light beam, means for splitting said coherent light beam into first and second respectively orthogonal, linearly polarized light beams, means for introducing said first and second orthogonal light beams into said first and second ends, respectively, of said fiber optic loop such that said first and second light beams travel through said loop in opposite directions, means for combining said first and second light beams into a recombined beam after they travel through said fiber optic loop, said recombined beam traveling along a same path as said coherent light beam, and means, interposed between said light source and said combining means, for separating said recombined beam from said coherent light beam such that substantially all of said coherent light beam are passed through said separating means to said introducing means and substantially all of said recombined beam passes through said separating means to be is separated from said coherent light beam and passed to the detector.

13. A fiber ring interferometer as set forth in claim 12 wherein said means for splitting said coherent light beam comprises a first polarizing beam splitter.

14. A fiber ring interferometer as set forth in claim 13 wherein said linearly polarized coherent light beam is polarized at 45 degrees and said first polarizing beam splitter comprises a 45 degree polarizing beam splitter such that said first and second light beams are of equal intensity.

15. A fiber ring interferometer as set forth in claim 14 wherein said means for combining comprises said first polarizing beam splitter.

16. A fiber ring interferometer as set forth in claim 15 wherein said loop is circular.

17. A fiber ring interferometer as set forth in claim 12 wherein said first and second beams of coherent light comprise optical pulses.

18. A fiber ring interferometer as set forth in claim 12 further comprising:

means, coupled to said separating means, for splitting said recombined beam into third and fourth beams corresponding to polarizations of said first and second beams, respectively, and wherein the detector is a balanced detector configured to determine a relative phase difference between said third and fourth light beams.

19. A fiber ring interferometer as set forth in claim 18 wherein said balanced detector detects a relative difference in intensity of said third and fourth light beams.

20. A fiber ring interferometer comprising:

a loop formed of linear polarization maintaining Kerr medium optical fiber, said loop comprising first and second ends twisted 90° relative to each other, a light source for producing a coherent light beam linearly polarized at 45 degrees, a first 45 degree polarizing beam splitter for splitting said coherent light beam into first and second respectively orthogonal, linearly polarized light beams of equal intensity, wherein introducing said first and second orthogonally polarized light beams to said first and second ends, respectively, of said fiber optic loop such that said first and second light beams travel through said loop in opposite directions, and combining said first and second light beams upon their exit from said first and second ends of said loop, respectively, to form a recombined beam, and a nonreciprocal element for separating said recombined beam from said coherent light beam such that substantially all of said coherent light beam is passed to said first 45 degree polarizing beam splitter and substantially all of said recombined beam is separated from said coherent light beam.

21. A fiber ring interferometer as set forth in claim 20 wherein said loop is circular.

22. A fiber ring interferometer as set forth in claim 20 wherein said first and second beams of coherent light comprise optical pulses.

23. A fiber ring interferometer as set forth in claim 22 wherein said nonreciprocal element comprises an optical switch.

24. A fiber ring interferometer as set forth in claim 20 wherein said nonreciprocal element comprises a Faraday circulator.

25. A fiber ring interferometer as set forth in claim 20 further comprising:

a birefringent plate configured to impart a one quarter wave shift in the polarization of said recombined beam;

a second 45 degree polarizing beam splitter configured to split said recombined beam into third and fourth beams corresponding to the polarizations of said first and second beams, respectively; and a balanced detector configured to receive said third and fourth beams and to determine any relative phase difference between the said third and fourth light beams.

26. A method for generating a squeezed vacuum light signal comprising the steps of:

introducing first and second beams of coherent light into first and second ends, respectively, of an fiber optic loop constructed of a Kerr medium such that said first and second light beams travel through said loop in opposite directions, said first and second beams being of respectively different polarizations, combining said first and second light beams into a recombined beam after they travel through said fiber optic loop, said recombined beam directed along a same path as said first and second beams, and separating said recombined beam from said first and seconds beams of light such that substantially all of said first and second beams of coherent light passes through said separating means and is available at said introducing step and substantially all of said recombined beam is passed through said separating means and separated from said coherent light first and second beams of and passed to a detector.

27. A method as set forth in claim 26 wherein said loop is comprised of polarization maintaining fiber.

28. A method as set forth in claim 27 wherein, said loop is comprised of linear polarization maintaining fiber, said first and second beams are linearly polarized, and said first and second ends of said loop are twisted relative to each other.

29. A method as set forth in claim 27 wherein said first and second beams are linearly polarized in, respectively, orthogonal directions, and said first and second ends of said loop are twisted 90° relative to each other.

30. A method as set forth in claim 29 wherein said optical fiber is formed into a circle.

31. A method as set forth in claim 30 wherein said step of combining said first and second beams to form said combined beam comprises passing said first and second beams through a polarizing beam splitter.

32. A method as set forth in claim 31 wherein said first and second light beams are of equal intensity.

33. A method as set forth in claim 26 wherein said first and second beams of coherent light comprise optical pulses.

34. A method as set forth in claim 26 further comprising the steps of:

separating light of said recombined beam contributed by said first light beam from said light of said recombined beam contributed by said second light beam based upon said respectively different polarizations of said first and second light beams; and determining a relative phase shift between said light contributed by said first light beam and said light contributed by said second light beam.

35. A method for generating a squeezed vacuum light signal comprising the steps of:

producing linearly polarized coherent light beam, splitting said coherent light beam into first and second respectively orthogonal, linearly polarized light beams, introducing said first and second orthogonal light beams into first and second ends, respectively, of a fiber optic loop formed of a linear polarization maintaining Kerr medium optical fiber, such that said first and second light beams travel through said loop in opposite directions, combining said first and second light beams into a recombined beam after they travel through said optical fiber, said recombined beam directed along a same path as said coherent light beam, and separating said recombined beam from said first and second beams such that substantially all of said first and second beams of coherent light pass through said separating means and are available at said introducing step and substantially all of said recombined beam is passed through said separating means and separated from said first and second light beams and passed to a detector.

36. A method as set forth in claim 35 wherein said step of splitting said coherent light beams comprises passing said beam through a first polarizing beam splitter.

37. A method as set forth in claim 36 wherein said linearly polarized coherent light beam is polarized at 45 degrees and said first polarizing beam splitter comprises a 45 degree polarizing beam splitter such that said first and second light beams are of equal intensity.

38. A method as set forth in claim 37 wherein said step of combining comprises passing said coherent light beam through said first polarizing beam splitter.

39. A method as set forth in claim 38 wherein said optical fiber loop is circular.

40. A method as set forth in claim 35 wherein said first and second beams of coherent light comprise optical pulses.

41. A method as set forth in claim 35 further comprising the steps of:

splitting said recombined beam into third and fourth beams corresponding to polarizations of said first and second beams, respectively; and determining a relative phase shift between said third and fourth light beams.

42. A fiber ring interferometer comprising:

a loop formed of a Kerr medium optical fiber material, said loop comprising first and second ends, means for introducing first and second beams of coherent light into said first and second ends, respectively, of said loop such that said first and second light beams travel through said loop in opposite directions, said first and second beams being of respectively different polarizations, means for combining said first and second light beams into a recombined beam after they travel through said fiber optic loop, and a nonreciprocal element for separating said recombined beam from said first and second beams such that substantially all of said first and second beams of coherent light are passed to said introducing means and substantially all of said recombined beam is separated from said first and second light beams.

43. A fiber ring interferometer comprising:

a loop formed of linear polarization maintaining Kerr medium optical fiber, said loop comprising first and second ends twisted 90° relative to each other, a light source for producing a linearly polarized coherent light beam, means for splitting said coherent light beam into first and second respectively orthogonal, linearly polarized light beams, means for introducing said first and second orthogonal light beams into said first and second ends, respectively, of said fiber optic loop such that said first and second light beams travel through said loop in opposite directions, means for combining said first and second light beams into a recombined beam after they travel through said fiber optic loop, said recombined beam traveling along a same path as said coherent light beam, and a Faraday circulator, interposed between said light source and said combining means, for separating said recombined beam from said coherent light beam such that substantially all of said coherent light beam are passed to said introducing means and substantially all of said recombined beam is separated from said coherent light beam.

44. A method for generating a squeezed vacuum light signal comprising the steps of:

producing linearly polarized coherent light beam, splitting said coherent light beam into first and second respectively orthogonal, linearly polarized light beams, introducing said first and second orthogonal light beams into first and second ends, respectively, of a fiber optic loop formed of a linear polarization maintaining Kerr medium optical fiber, such that said first and second light beams travel through said loop in opposite directions, combining said first and second light beams into a recombined beam after they travel through said optical fiber, said recombined beam directed along a same path as said coherent light beam, and passing said recombined beam through a nonreciprocal element to separate said recombined beam from said first and second beams such that substantially all of said first and second beams of coherent light are available at said introducing step and substantially all of said recombined beam is separated from said first and second light beams.

45. A method for generating a squeezed vacuum light signal comprising the steps of:

introducing first and second beams of coherent light into first and second ends, respectively, of an fiber optic loop constructed of a Kerr medium such that said first and second light beams travel through said loop in opposite directions, said first and second beams being of respectively different polarizations, combining said first and second light beams into a recombined beam after they travel through said fiber optic loop, said recombined beam directed along a same path as said first and second beams, and passing said recombined beam through a nonreciprocal element to separate said recombined beam from said coherent light beam such that substantially all of said coherent light beam is available at said introducing step and substantially all of said recombined beam is separated from said coherent light beam.

* * * * *

UNITED STATES PATENT AND TRADEMARK OFFICE

CERTIFICATE OF CORRECTION

PATENT NO. : 5,677,767
DATED : October 14, 1997
INVENTOR(S) : Masataka Shirasaki and Hermann A. Haus It is certified that error appears in the above-identified patent and that said Letters Patent is hereby corrected as shown below:

[73] Assignee: Massachusetts Institute of Technology, Cambridge, MA    and Fujitsu Limited, Nakaharu-Ku Kawasaki, Japan Signed and Sealed this Seventh Day of April, 1998

Attest:

BRUCE LEHMAN

*Attesting Officer*    *Commissioner of Patents and Trademarks*